(12) United States Patent
Kaufmann

(10) Patent No.: US 6,453,335 B1
(45) Date of Patent: Sep. 17, 2002

(54) PROVIDING AN INTERNET THIRD PARTY DATA CHANNEL

(76) Inventor: Oliver Kaufmann, Haunstetterstrausse 19, Augsburg, D-86161 (DE)

( * ) Notice: Subject to any disclaimer, the term of this patent is extended or adjusted under 35 U.S.C. 154(b) by 0 days.

(21) Appl. No.: 09/348,851

(22) Filed: Jul. 7, 1999

(30) Foreign Application Priority Data

Jul. 21, 1998 (EP) ........................................ 98 113 565
Aug. 7, 1998 (EP) ........................................ 98 114 918

(51) Int. Cl.[7] .............................................. G06F 15/16
(52) U.S. Cl. ...................... 709/203; 709/202; 709/204; 709/217; 709/224; 709/229; 707/10
(58) Field of Search .............................. 709/200–205, 709/217–219, 223–224, 227–229; 707/10, 102–104; 705/14, 26–27, 35–37

(56) References Cited

U.S. PATENT DOCUMENTS

| | | | | |
|---|---|---|---|---|
| 6,026,368 A | * | 2/2000 | Brown et al. | 709/224 |
| 6,088,688 A | * | 7/2000 | Crooks et al. | 709/217 |
| 6,119,164 A | * | 9/2000 | Basche | 709/229 |
| 6,144,944 A | * | 11/2000 | Kurtzman , II et al. | 705/14 |
| 6,173,287 B1 | * | 1/2001 | Eberman et al. | 709/217 |
| 6,233,618 B1 | * | 5/2001 | Shannon | 709/229 |
| 6,330,566 B1 | * | 12/2001 | Durham | 709/203 |
| 6,347,307 B1 | * | 2/2002 | Sandhu et al. | 705/35 |
| 6,366,948 B1 | * | 4/2002 | Teibel | 709/204 |

FOREIGN PATENT DOCUMENTS

WO    WO 98/34189    8/1998    ........... G06F/17/60

OTHER PUBLICATIONS

Kohda, Youji et al., "Ubiquitous Advertising on the WWW-:Merging Advertisement on the Browser," Computer Networks and ISDN Systems 28, 1996, pp. 1493–1499.

* cited by examiner

*Primary Examiner*—Bharat Barot
(74) *Attorney, Agent, or Firm*—Gates & Cooper LLP

(57) ABSTRACT

In a method, apparatus and program product for providing an internet third party data channel, an existing data channel is monitored for a data communication having a predetermined property. Upon detection of such data communication, a data source is accessed to obtain third party data, the data communication is modified or replacing in response to the third party data, and the modified or replaced data communication is sent to the originally intended recipient. The present invention allows the incorporation of third party data into existing internet client/server connections in a convenient and flexible way.

31 Claims, 3 Drawing Sheets

PROVIDING AN INTERNET THIRD PARTY DATA CHANNEL

FIELD OF THE INVENTION

Figure 1:
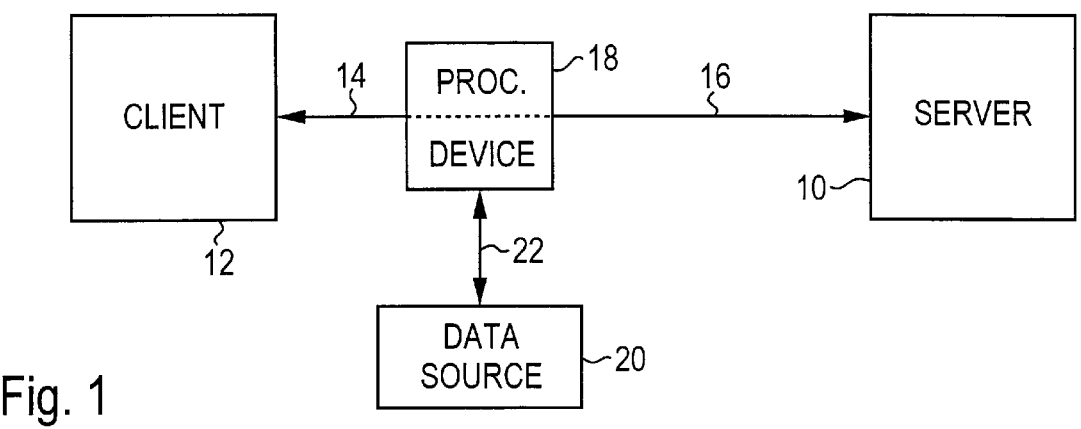

The invention relates to a method and apparatus for transporting and delivering data across the internet. More particularly it relates to a method and apparatus for providing an internet third party data channel.

BACKGROUND OF THE INVENTION

The internet as a means for world wide data transport is in essence a network of internet severs, routers and clients. The low-level, packet oriented transport of data through this network is controlled by the TCP/IP protocol, a description of which is given in section 5.5.2 of the book "Computer Networks" by A. S. Tanen-baum, 2nd edition, published by Prentice-Hall, 1989.

On the higher protocol levels, the usual way for communicating data across the internet is by means of dedicated client/server applications implementing a suitable application level protocol. The protocol normally employs a request/response mechanism and uses some kind of status information to control the data transmission. A well-known example of such a client/server application in the context of the internet is the World Wide Web, using HTTP (hypertext transfer protocol) and HTML (hypertext markup language) as application level protocols. Information about HTTP and HTML can be found in the World Wide Web at the URL (unique resource locator)http://www.w3c.org. The HTTP protocol is defined in document RFC 2068.

A basic paradigm of internet client/server applications and the associated application level protocols is that a logical or physical connection between two parties, namely the internet client and the internet server, is assumed. In other words, the two parties are considered to be connected via a (possibly logical) data channel.

All other parties involved in the actual transportation process (for example, routers, proxies and so on) are regarded as transparent. For example, a proxy can be thought of as an application level router, not contributing to the data stream being transported through it. This logical transparency of a proxy is maintained even if the proxy, in fact, forwards cached copies of requested objects to a client.

Because of this paradigm of a two party communication, it is difficult to incorporate third party data into an existing data channel between an internet server and an internet client. However, inclusion of such third party data is often desirable in order to provide value added services or enhanced security and information features, for example in the field of portal services.

OBJECTS AND SUMMARY OF THE INVENTION

A main object of the present invention is therefore to provide means for incorporating third party data into existing internet client/server connections in a convenient and flexible way. In particular, it is desired that the third party and the data supplied by it do not need to be related to or associated with the client and/or the server.

According to the present invention, this object is solved by methods, an apparatus and a computer program product having the features of the independent claims. The dependent claims concern advantageous embodiments of the invention.

A basic idea of the invention is to establish the third party data channel by intercepting the data communications transmitted on an existing data channel between a server and a client. For example, the client may be an internet browser or a program module of such a browser, in particular a display module. The data communications are generally forwarded to the intended recipient. However, if a predetermined data code (for example, a status code of the application protocol) is detected or some other condition is met, the third party data is inserted into the communication on the existing data channel, or said communication is modified otherwise on the basis of the third party data or even replaced by the third party data.

Based on this idea, the present invention allows the creation of a new logical transport channel between the third party data source on one side and the client and/or server on the other side. In effect, the original link between the client and the server can now be shared by three or more parties. The user or third party may create, exploit and extend the new data channel independently of the remote server and/or the client. The third party data may or may not be related to the data sent by the server. The properties of the third party data channel can be individually controlled and configured by the user, the system administrator or the third party.

The invention greatly enhances the ease and flexibility of data distribution via the internet and forms a possible basis for a series of new online services. For example, information supplied by an internet service provider or any other entity forwarding internet traffic or a portal service provider may be inserted into the existing data channel. This allows easy local language support and guidance and portal services. No new client and server applications are needed. All major internet protocols may be supported.

An especially advantageous application of the present invention is in the field of portal services. Generally, a portal service is a kind of directory homepage which can be accessed by users as a starting point for internet browsing. The portal homepage acts as a "portal" to the rest of the internet, giving instant and easy access to search engines, reviews and so on. Portal services are currently offered by many internet companies using regular web servers, standard HTML pages and standard browsers. In this context, the paradigm of a two party communication as described above applies.

Because of this paradigm, it is difficult for a portal site to directly and automatically present the user with additional (third party) information while the user accesses other sites. Once the user has left the portal web site, the portal service can no longer automatically help and guide the user because a deliberate action of the user is required to re-enter the portal service.

The invention may be employed to close this gap between the user and the portal service. For example, when the user causes an error condition during browsing, the browser (or a proxy or a router) may intercept the error message before it is displayed, obtain appropriate help data from the third party portal service, and display the help data to the user, thus, e.g., indicating alternative site names or an explanation of the error. This process is independent of the site the user accessed when the error occurred and does not require an additional tool or window or user interaction. The invention is not limited to portal services, but can be applied to a wide variety of information retrieval or user dialog systems on the internet.

According to the invention, each data communication is monitored and possibly modified. In this context, a "data communication" may or may not have a predefined length. For example, a data communication may comprise a predefined or an arbitrary number of TCP/IP datagrams or memory words (e.g., bytes). The term "data channel" as used herein shall be understood as denoting any logical or physical path for transferring or communicating data between two entities. For example, a data channel may be an internet connection or any kind of communication mechanism between program modules including shared memory regions. The term "module" is used to denote functional features of a program, independently of the actual structure of the program and of the programming technique and language in which the program is written. A module in this sense may also be a plugin or tool or applet.

In preferred embodiments of the invention, the third party data is simply included into the data communication. The third party data may be encapsulated and/or marked by suitable tags or attributes. In other embodiments, the third party data is at least in part used to control a modification or deletion of data contained in the original data communication. Thus the data exchange between the server and the client may be modified, deleted, replaced or enriched on the basis of the third party data. In still other embodiments, the third party, the client and the server may interact in a complex way including multiple request and response dialogs between all parties.

It is especially preferred to monitor and intercept data communications running from the server to the client. However, also data communications directed towards the server may be monitored in order to control properties of the third party data inclusion mechanism. In some embodiments of the invention, the client may be an internet browser. It is also possible that the client itself monitors, parses and modifies the data sent from and to the server that has been accessed by the user, and obtains the third party data by opening a further connection to a third party server. Preferably the method of the invention is performed automatically, i.e. without user intervention.

The predetermined property of the data communication, which triggers the inclusion mechanism of the present invention, is preferably the occurrence of a predetermined data code. In preferred embodiments of the invention, the predetermined data code is an application level protocol code, i.e. a code defined by the protocol established between the client and server applications. Such protocols may be HTML or HTTP or similar protocols. In particular, the code may be a protocol status code or a HTML tag like, e.g. "<PSI (options)>" or "<CSI (options)>" or "<!—psi (options)>".

Most preferably, the predetermined data code is one which is issued by the server to signal the occurrence of some event, e.g. an error condition. This means that, in such preferred embodiments, the predefined data code is not already present in the files stored with the server, but is generated by the server at run time. The predefined data code preferably is used to signal a server-related event, such that the data supplier at the server side does not need to have any knowledge of whether or not a data replacement according to the present invention will occur at the client side or during the internet data transmission.

In further preferred embodiments, further data codes are used to control properties of the third party data inclusion mechanism. Such codes may also be application level protocol codes, for example HTML tags or HTTP attributes.

It is further preferred to use the third party data channel only when the transmission load originating from the server is low. Thus the efficiency of the user's internet connection can be increased. For example, transmission of the third party data can be started immediately while waiting for data from the remote server to arrive. The third party data can be inserted into the connection on a chunk by chunk basis (i.e. multiplexed) when waiting for data from the server.

Further embodiments may use failed requests or unavailable links or documents to automatically look up related information or links and present same to the user for convenient browsing.

The apparatus of the present invention may be further developed by features mirroring those recited above and/or in the dependent method claims. In further preferred embodiments, the apparatus is an internet router and/or an internet proxy and/or an internet filter. The processing device of the apparatus may be used both for the functionality of the present invention and that of a router, proxy, filter, client or other soft- or hardware.

Likewise, the computer program product of the present invention may be further developed by features mirroring those recited above and/or in the dependent method claims. In further preferred embodiments, the computer program product may be an internet browser or any kind of extension module for such a browser. The product may be stored on a computer readable data carrier (e.g., a floppy disk or a CD-ROM) or loaded into a computer for execution.

Further objects and advantages will become apparent from the drawings and the following detailed description.

DETAILED DESCRIPTION OF SAMPLE EMBODIMENTS

Figure 3:
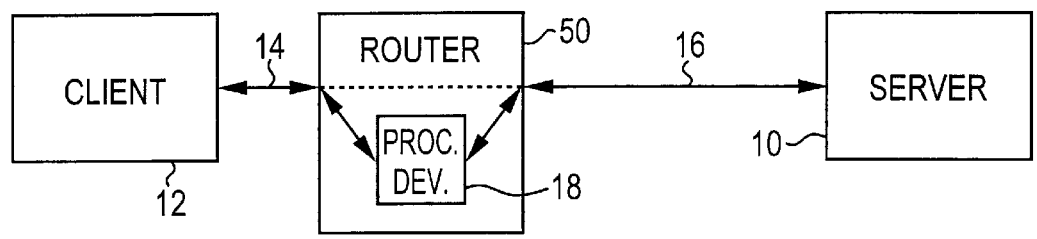
Figure 4:
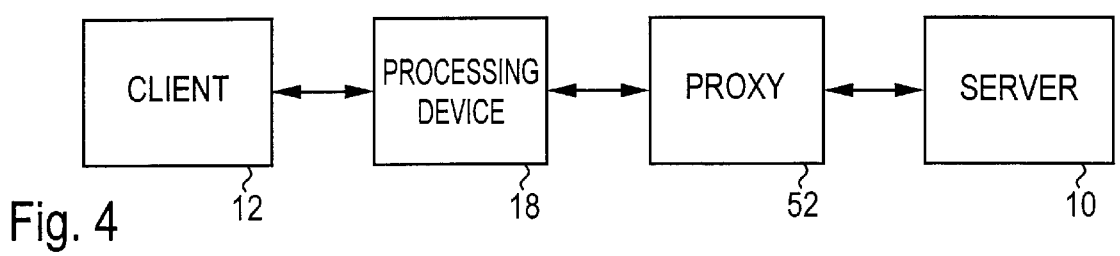
Figure 5:
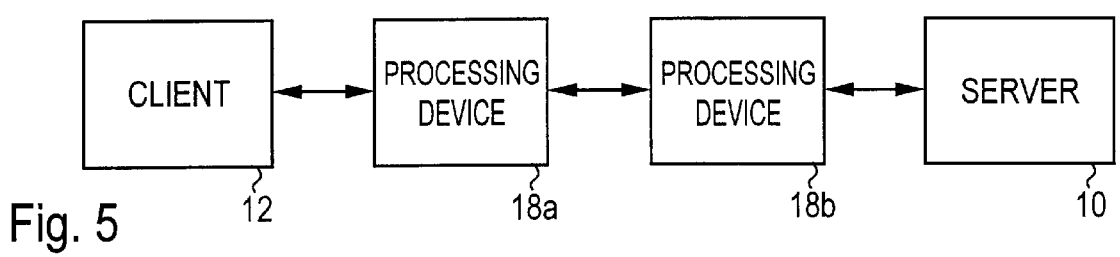
Figure 2:
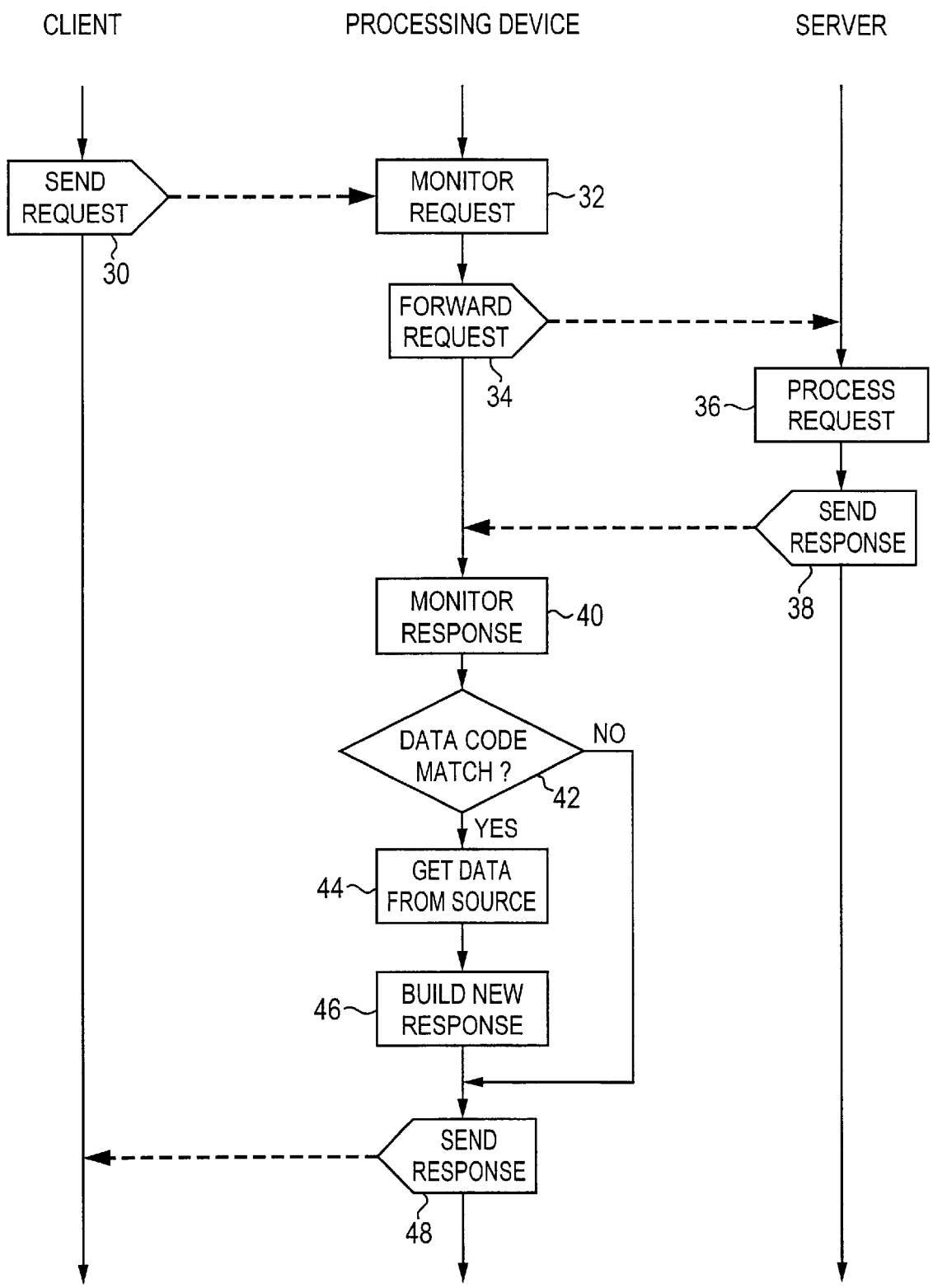
Figure 6:
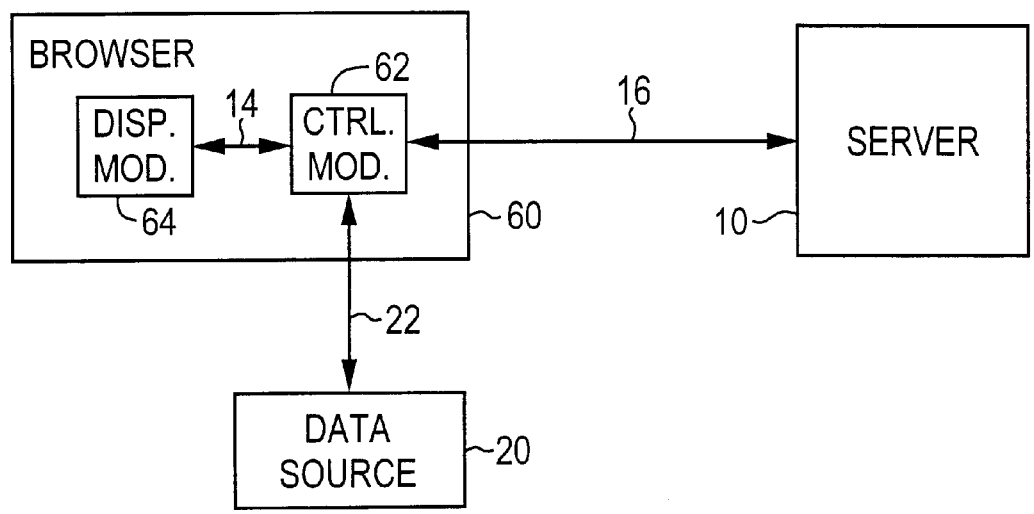

Several sample embodiments of the present invention will now be described in detail. Reference is made to the schematic drawings, in which:

FIG. 1 shows a block diagram of the logical structure of one sample embodiment of the invention, FIG. 2 shows a flow diagram of the execution of the method according to a sample embodiment of the invention, FIG. 3 to FIG. 5 show block diagrams of the logical structure of further sample embodiments of the invention, and FIG. 6 shows a block diagram of the logical structure of yet a further sample embodiment of the invention.

FIG. 1 shows an internet server 10 and an internet client 12. These two parties communicate and exchange data with each other, using common applications and application protocols. In the present sample embodiment, the server 10 is a World Wide Web server sending documents in the content description language HTML, the client 12 is a standard World Wide Web browser interpreting and displaying HTML documents, and HTTP is used as the transport and application protocol. In alternative embodiments, other common internet protocols like FTP, Gopher, NNTP, SMTP and/or other content description languages such as SMIL and VRML are employed.

A logical, bidirectional, dedicated channel connecting the server 10 and the client 12 is formed by two channel sections 14, 16. Data transmission on this channel occurs according to the above-mentioned application protocols by the exchange of request and reply messages. At least the reply messages include some kind of status codes representing the state and result of any given transaction.

A processing device 18 incorporating the present invention is logically connected to the channel sections 14, 16, thus intercepting the communication channel between the server 10 and the client 12. In other words, the processing device 18 receives and analyses all TCP/IP datagrams traveling between the server 10 and the client 12.

A third party data source 20, for example a data base, is connected to the processing device 18 by a data link 22. The data link 22 may be a physical line or a logical connection running via a network. The communication between the processing device 18 and the data source 20 may or may not be configurable. It may comprise plain text or data base queries or calls to external programs or CGI scripts. Any kind of protocol can be used for this communication, including HTTP.

Operation of the system of FIG. 1 is shown in FIG. 2, which depicts the processing steps and communication events occurring in the client 12, the processing device 18 and the server 10. The client 12 first sends a request to the server 10 (step 30). This request is monitored by the processing device 18 (step 32). Since, in the present sample embodiment, no third party data is included in communications to the server 10, the request is forwarded unchanged to the server 10 (step 34).

The server 10 now processes the received request (step 36) and sends an appropriate response (step 38). The response is monitored (step 40) by the processing device 18 for the occurrence of a predetermined data code (step 42). If no match occurs, execution proceeds with step 48, in which the response of the server 10 is forwarded to the client 12 without modification.

If, on the other hand, any of a plurality of predetermined data codes is found in the response, appropriate third party data is obtained from the data source 20 (step 44), and a new response is built on the basis of the third party data and/or the data contained in the original response from the server 10 (step 46). This new response is then forwarded to the client 12 (step 48). The client 12 displays the included data in the same way as data sent directly by the server 10. Thus the operation of the processing device 18 is completely transparent both for the client 12 and the server 10. In effect, a (logical) third party data channel has been formed between the data source 20 and the client 12. This data channel comprises the data link 22 and the channel section 14.

The steps summarized above will now be described in more detail in a system where HTTP is used as the transport protocol and HTML is used as the content description language. It should, however, be kept in mind that the present invention can be used with a variety of other protocols and languages.

A response as defined in the HTTP specification (RFC 2068) comprises a response header and possibly a message body. The response header includes a status line, and the status line in turn contains a status code and a reason phrase. Generally, status codes are well-suited as predefined data codes to trigger operation of the third party data inclusion mechanism in step 42. In the present sample embodiment, status codes representing error conditions are used. Such status codes signal that no message body could be provided by the server 10, such that the bandwidth of the channel section 14 can be used for transmitting third party data without impeding any data transfer from the server 10 to the client 12. Specifically, the following HTTP status codes are used:

| Status code: | Reason phrase (example): |
| --- | --- |
| 3xx | Redirection |
| 4xx | Client Error |
| 5xx | Server Error |
| 204 | No Content |

Considering a possible execution sequence of the steps shown in FIG. 2 for the present sample embodiment of the invention, the HTTP request of the client 12 sent in step 30 may be "GET/xyz HTTP/1.0". Assuming that the server 10 cannot access a file named "xyz", the status line of the response sent by the server 10 in step 38 will be "HTTP/1.0 404 Not Found". In this response, "404" is the status code and "Not Found" is the reason phrase.

The processing device 18 will detect a status code match in step 42 and will obtain suitable third party data from the data source 20. Such data may, for example, be a technical explanation of the error, or a translation of the reason phrase into the national language, or an advertisement, or a list of links or documents related to the requested one, or a news ticker, or a portal service, or a user support system, or a recently arrived E-mail, or an active channel element, or a movie, or some other data using the bandwith available in the channel section 14.

In step 46, the processing device will build a new response containing the third party data in the message body and the status line "HTTP/1.0 404 New Data". In this status line, the fact that the original request could not be fulfilled is still visible. This may be desirable in order to avoid possible problems with a caching mechanism of the client 12 (browser). In an alternative embodiment, a response status line "HTTP/1.0 200 New Data" is generated, the status code 200 denoting a successful transaction.

In various alternative embodiments of the present invention, the third party data is selected depending on the status code. More than a single third party data source and data link may be used. Selection of the third party data may also be controlled by the user via the client 12. For example, HTTP attributes may serve to transmit information to the processing device 18, said information controlling either the third party data to be accessed or other properties of the inclusion mechanism.

In an embodiment in which HTTP attributes are used to control operation of the processing device 18, a request sent by the client 12 may have the status line "GET/xyz HTTP/1.0" and contain the additional HTTP attribute "allow: news", denoting that the user wants to receive current news from the third party. When the request is monitored by the processing device 18, the attribute "allow: news" is deleted from the request before sending it to the server 10. Therefore, the server 10 does not need to know or interpret the "allow: news" attribute.

The server 10, in response to the request, will send a response of, for example, "HTTP/1.0 204 No Content". The processing device will monitor the response and obtain appropriate news data from the data source 20. This data will be included in a modified response, which will be sent to the client 12 with the modified status line "HTTP/1.0 200 News Data".

Generally, in various further embodiments, the data from the third party can be incorporated either into the HTTP protocol header or into the message body of any client or server document being transported. For example, the additional data can be put into the reason phrase of the status line or into attributes of the protocol header, or it can be embedded into the HTML document itself as regular HTML code. It may or may not be encapsulated by surrounding HTML tags (e.g. <PSIBLOCK> data </PSIBLOCK> or <CSIBLOCK> data </CSIBLOCK>). The data can be sent as plain HTML code such that it can instantly be viewed by the user through his standard browser without opening a new window.

In yet further embodiments of the invention, special server or client applications are used, which are aware of the third party data inclusion mechanism. By sending special tags or attributes via the existing channel sections 14, 16, such applications can influence the way of operation of the processing device 18. For example, insertion of certain third party data items can be allowed, denied or requested, or the place or layout of the additional data items can be controlled. Such third party data aware applications may also extract the additional data stream in a transparent way and feed it into other applications such as offline readers, news tickers or active channel applications.

The processing device 18 shown in FIG. 1 is implemented as a stand alone product. However, the method of the present invention may be implemented in a transparent router or transparent proxy or transparent filter. As an example, a transparent router 50 is shown in FIG. 3. The logical channel connecting the server 10 and the client 12 (channel sections 14, 16) runs via the router 50 or proxy or filter. The processing device 18, which is part of the router 50 or proxy or filter, monitors and intercepts the connection in the way discussed above. The processing device 18 may also be used for performing the functions of the router 50 or proxy or filter. In further alternative embodiments, the processing device 18 may be implemented as a suitable software module of a router or proxy or filter or even the client.

Since the method and apparatus of the present invention are essentially transparent for the client and server applications, an arbitrary chaining of stand alone processing devices 18 and proxies, filters and routers with or without the third party data inclusion functionality of the present invention is possible. For example, FIG. 4 shows a configuration in which a stand alone processing device 18 and a stand alone proxy 52 are connected between the server 10 and the client 12. FIG. 5 depicts a system in which two stand alone processing devices 18a, 18b are switched into the data channel.

The stack of protocol layers of the various devices mentioned above can be illustrated as follows:
- application layer (client and server),
- method and apparatus of the present invention,
- proxy and filter,
- packet or network layer (router), and
- data input/output.

The alternative embodiment shown in FIG. 6 uses a browser 60 to implement the internet client. The browser 60 runs on a standard personal computer equipped with suitable resources and an operating system like those presently available under the trademarks "Microsoft Windows" or "Macintosh OS" or "OS/2".

The browser 60 itself is an extended version of a known browser, for example a browser presently available under the trademarks "Netscape Navigator" or "Net-scape Communicator" or "Microsoft Internet Explorer". The browser 60 comprises a plurality of program modules, some of which may be part of the main program and some others may be implemented as plugins or applets or extensions. Among these program modules are a control module 62 performing a variety of control functions and a display module 64 processing the data to be displayed to the user. The same browser, personal computer and operating systems can also be used to implement the internet client 12 in the previously described embodiments shown in FIG. 1 to FIG. 5.

The program modules of the browser 60 of FIG. 6 communicate with each other via data channels, which are provided by a suitable communication mechanism. For example, the communication mechanism may be a shared access to a common memory region or to common variables.

The data channel connecting the control module 62 to the display module 64 in part forms the channel section 14. In this sample embodiment, the data source 20 is an internet server of a portal service provider, and the data link 22 is a standard HTTP channel. Operation of the embodiment of FIG. 6 is as shown in FIG. 2, wherein the display module 64 of the browser 60 serves as the client, and the control module 62 of the browser 60 (running on a standard personal computer) serves as the processing device. The control module 62 monitors the incoming data on the channel section 16. Upon detection of an error code, the data link 22 to the portal service is established. The data obtained from the portal service is communicated to the display module 64 via the channel section 14, and it is shown to the user in the regular browser window on a CRT screen. These steps are performed automatically, i.e., without user interaction.

In order to obtain appropriate third party data, the control module 62 transmits the error code and possibly other information (e.g., the requested URL, the full client request, the full server response, a user identification, and/or user-selected parameters) to the data source 20 in step 44 shown in FIG. 2. For example, the control module 62 may issue the HTTP request "GET /cgi-bin/support?errorcode+parameters+userid". In response thereto, the portal service can supply useful data like alternative addresses or problem solving hints to the user.

During an internet browsing session, a single portal service provider or several different providers may be accessed. The choice of the provider may be hardcoded in the browser, or preset by an internet access provider, or configurable by the user. The features and possibilities mentioned with respect to the embodiment of FIG. 6 are also applicable to all other embodiments of the invention, and vice versa.

Possible applications of the present invention include local news or stock ticker applications; fade in provider identifications, watermarks or copyright notices; the provision of information, advertising, sponsoring and online shopping; user guidance and support systems; portal services; search engines; directories; active channels; security enhancements; password verifications; and remote control and auto update features.

It can thus be seen that the invention can be used for incorporating third party data into existing internet client/server connections in a convenient and flexible way. The particulars contained in the above description of sample embodiments should not be construed as limitations of the scope of the invention, but rather as exemplifications of preferred embodiments thereof. Many other variations are possible and will be readily apparent to persons skilled in the art. Accordingly, the scope of the invention should be determined not by the embodiments illustrated, but by the appended claims and their legal equivalents.

I claim:

1. A method for providing an internet third party data channel, said third party data channel being established within an existing data channel between an internet server and an internet client, said third party data channel connecting a data source distinct from said internet server to said internet client, said method including the steps of:
   a) using a processing device distinct from said internet server for monitoring said existing data channel for a data communication having a predetermined property, said data communication having an intended recipient of one of said internet server and said internet client,
   b) upon detection of said data communication, performing:

b1) the step of accessing said data source to obtain third party data, b2) a step selected from the group consisting of the step of modifying said data communication in response to said third party data and the step of replacing said data communication in response to said third party data to obtain a resultant data communication, and b3) the step of sending said resultant data communication to said intended recipient.

2. The method of claim 1, wherein said predetermined property of said data communication is the property that said data communication contains a predetermined data code.

3. The method of claim 2, wherein said predetermined data code is a code selected from the group consisting of an application level protocol code, an application level protocol status code, an HTML tag and a HTTP code.

4. The method of claim 3, wherein further predetermined data codes are used to control at least one of the creation, the usage and a predetermined property of said third party data channel.

5. The method of claim 1, wherein said intended recipient of said data communication is said internet client.

6. The method of claim 1, wherein said processing device is distinct from said internet client.

7. The method of claim 1, wherein said data source is independent from at least one of said internet server and said internet client.

8. The method of claim 1, wherein data is only transmitted on said third party data channel when the data transmission rate of said server to said client is below a predetermined threshold.

9. The method of claim 1, wherein said step b2) is selected from the group consisting of the step of including said third party data into said data communication, the step of modifying data contained in said data communication in response to said third party data, the step of removing data contained in said data communication in response to said third party data, the step of enriching data contained in said data communication in response to said third party data, and the step of replacing data contained in said data communication in response to said third party data.

10. A method for providing an internet third party data channel, said third party data channel being established within an existing data channel between an internet server and a display module of an internet browser, said third party data channel connecting a data source distinct from said internet browser to said display module, said method including the steps of:

a) using a control module of said internet browser for monitoring said existing data channel for an incoming data communication having a predetermined property, b) upon detection of said data communication, performing:

b1) the step of accessing said data source to obtain third party data, b2) a step selected from the group consisting of the step of modifying said data communication in response to said third party data and the step of replacing said data communication in response to said third party data to obtain a resultant data communication, and b3) the step of communicating said resultant data communication to said display module.

11. The method of claim 10, wherein said predetermined property of said data communication is the property that said data communication contains a predetermined data code.

12. The method of claim 11, wherein said predetermined data code is a code selected from the group consisting of an application level protocol code, an application level protocol status code, an HTML tag and a HTTP code.

13. The method of claim 12, wherein further predetermined data codes are used to control at least one of the creation, the usage and a predetermined property of said third party data channel.

14. The method of claim 10, wherein said data source is distinct from at least one of said internet server and said internet browser.

15. The method of claim 10, wherein said data source is independent from at least one of said internet server and said internet browser.

16. The method of claim 10, wherein said third party data obtained in step b1) is influenced at least by said predetermined data code.

17. The method of claim 10, wherein said step b2) is selected from the group consisting of the step of including said third party data into said data communication, the step of modifying data contained in said data communication in response to said third party data, the step of removing data contained in said data communication in response to said third party data, the step of enriching data contained in said data communication in response to said third party data, and the step of replacing data contained in said data communication in response to said third party data.

18. An apparatus for providing an internet third party data channel, said third party data channel being established within an existing data channel between an internet server and an internet client, said third party data channel connecting a data source distinct from said internet server to said internet client, said apparatus comprising:

a processing device distinct from said internet server for monitoring said existing data channel for a data communication having a predetermined property, said data communication having an intended recipient of one of said internet server and said internet client, said processing device being adapted, upon detection of said data communication, to access said data source to obtain third party data, to execute a step selected from the group consisting of the step of modifying said data communication in response to said third party data and the step of replacing said data communication in response to said third party data to obtain a resultant data communication, and to send said resultant data communication to said intended recipient.

19. The apparatus of claim 18, wherein said apparatus is an apparatus selected from the group consisting of an internet router and an internet proxy and an internet filter.

20. The apparatus of claim 18, wherein said predetermined property of said data communication is the property that said data communication contains a predetermined data code.

21. The apparatus of claim 20, wherein said predetermined data code is a code selected from the group consisting of an application level protocol code, an application level protocol status code, an HTML tag and a HTTP code.

22. The apparatus of claim 18, wherein said intended recipient of said data communication is said internet client.

23. The apparatus of claim 18, wherein said processing device is distinct from said internet client.

24. The apparatus of claim 18, wherein data is only transmitted on said third party data channel when the data transmission rate of said server to said client is below a predetermined threshold.

25. The apparatus of claim 18, wherein said step for obtaining said resultant data communication is selected from the group consisting of the step of including said third party data into said data communication, the step of modifying data contained in said data communication in response to said third party data, the step of removing data contained in said data communication in response to said third party data, the step of enriching data contained in said data communication in response to said third party data, and the step of replacing data contained in said data communication in response to said third party data.

26. A computer program product for execution by a general purpose computer for providing an internet third party data channel, said third party data channel being established within an existing data channel between an internet server and a display module of an internet browser running on said general purpose computer, said third party data channel connecting a data source distinct from said internet browser to said display module, said computer program product including instructions for making said general purpose computer perform the steps of:
  a) monitoring said existing data channel for an incoming data communication having a predetermined property,
  b) upon detection of said data communication, performing:
    b1) the step of accessing said data source to obtain third party data,
    b2) a step selected from the group consisting of the step of modifying said data communication in response to said third party data and the step of replacing said data communication in response to said third party data to obtain a resultant data communication, and
    b3) the step of communicating said resultant data communication to said display module.

27. The computer program product of claim 26, wherein said computer program product is one of said internet browser, a module of said internet browser, a plugin for said internet browser and an auxiliary program for said internet browser.

28. The computer program product of claim 26, wherein said predetermined property of said data communication is the property that said data communication contains a predetermined data code.

29. The computer program product of claim 28, wherein said predetermined data code is a code selected from the group consisting of an application level protocol code, an application level protocol status code, an HTML tag and a HTTP code.

30. The computer program product of claim 26, wherein said step b2) is selected from the group consisting of the step of including said third party data into said data communication, the step of modifying data contained in said data communication in response to said third party data, the step of removing data contained in said data communication in response to said third party data, the step of enriching data contained in said data communication in response to said third party data, and the step of replacing data contained in said data communication in response to said third party data.

31. The computer program product of claim 26, wherein said computer program product is stored on a computer readable data carrier.

* * * * *

UNITED STATES PATENT AND TRADEMARK OFFICE
CERTIFICATE OF CORRECTION

PATENT NO. : 6,453,335 B1
DATED : September 17, 2002
INVENTOR(S) : Oliver Kaufmann It is certified that error appears in the above-identified patent and that said Letters Patent is hereby corrected as shown below:

<u>Title page,</u>
Item [76], "Haunstetterstrausse" should read -- Haunstetterstrasse --.

Signed and Sealed this

Eighth Day of April, 2003

JAMES E. ROGAN
*Director of the United States Patent and Trademark Office*